(12) United States Patent
Nakamura et al.

(10) Patent No.: US 7,703,072 B2
(45) Date of Patent: Apr. 20, 2010

(54) COMPONENT-BASED APPLICATION CONSTRUCTING METHOD

(75) Inventors: Tomohiro Nakamura, Hachioji (JP); Hiroaki Fujii, Tokorozawa (JP); Toshihiro Eguchi, Yokohama (JP); Chiaki Kato, Kawasaki (JP); Kazuya Hisaki, Yokohama (JP); Masaru Takeuchi, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 1326 days.

(21) Appl. No.: 11/070,499

(22) Filed: Mar. 3, 2005

(65) Prior Publication Data

US 2006/0085664 A1    Apr. 20, 2006

(30) Foreign Application Priority Data

Sep. 29, 2004    (JP)    ............................. 2004-283032

(51) Int. Cl.
G06F 9/44    (2006.01)
G06F 17/00    (2006.01)
G06N 5/02    (2006.01)

(52) U.S. Cl. ............................. 717/107; 706/46; 706/61

(58) Field of Classification Search ........................ None
See application file for complete search history.

(56) References Cited

U.S. PATENT DOCUMENTS 6,862,696 B1 *    3/2005    Voas et al. ..................... 714/38
2003/0163780 A1 *    8/2003    Kossa ........................ 715/500
2004/0205730 A1 *    10/2004    Week ........................ 717/136

(Continued)

FOREIGN PATENT DOCUMENTS

JP    2002-82926    9/2000

(Continued)

OTHER PUBLICATIONS

Chaitanya Kallepalli and Jeff Tian, Measuring and Modeling Usage and Reliability for Statistical Web Testing, Nov. 2001, IEEE Transactions on Software Engineering, vol. 27, pp. 1023-1035.*

(Continued)

Primary Examiner—Tuan Q Dam
Assistant Examiner—Hanh T Bui
(74) Attorney, Agent, or Firm—Stites & Harbison PLLC; Juan Carlos A. Marquez, Esq.

(57) ABSTRACT

Reliability is evaluated in constructing a component based-on application and an application for realizing reliability required can be constructed efficiently. A run-time history such as an occurrence frequency of errors, a recovery time required at error occurrence, and a processing capacity at preventive maintenance is added per software component to a run-time history list having been recoded per execution environment such as an application ID, combined component IDs, and executed hardware ID. From these pieces of information, an interval of performing preventive maintenance recommended per software component during system construction is calculated. By comparing reliability per software component and reliability required for the system, advisability is determined and conformance is evaluated. An execution schedule for preventive maintenance and a processing capability are calculated about the entire component-based application created by combining the software components. By calculating the reliability and the processing capability in the entire system to be compared to those required for the entire system, advisability is determined and conformance is evaluated.

8 Claims, 11 Drawing Sheets

U.S. PATENT DOCUMENTS

2004/0215762 A1* 10/2004 Oulu et al. .................. 709/223
2005/0235248 A1* 10/2005 Victoria et al. .............. 717/102
2005/0262462 A1* 11/2005 Janakiraman et al. .......... 716/9

FOREIGN PATENT DOCUMENTS

JP          2004-220453          1/2003

OTHER PUBLICATIONS

Vittorio Cortellessa et al., Early reliability assessment of UML based software models, Jul. 24-26 2002, ACM.*

Ira Cohe et al.; Capturing, Indexing, Clustering, and Retrieving System History; Oct. 23-26, 2005; ACM; pp. 105-118.*

George Candea et al., "Microreboot—A Technique for Cheap Recovery", OSDI '04, 6th Symposium on Operating Systems Design and Implementation, (2004), pp. 31-44.

* cited by examiner

FIG. 5

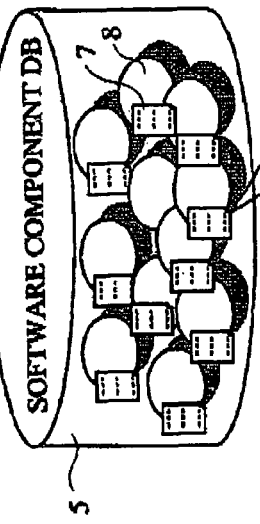

| INDEX ~ 36 | UPDATE | SEARCH KEY | EVALUATION FUNCTION |
|---|---|---|---|
| A) BUSINESS/JOB TYPES | AT CONSTRUCTION | BUSINESS JOB REQUIREMENT | |
| B) APPLICATION | AT CONSTRUCTION | APPLICATION NAME | |
| C) EXECUTION SYSTEM | AT EXECUTION | HARDWARE ID | |
| D) RUN-TIME SYSTEM LOAD | AT EXECUTION | LOAD PREDICTION, LOAD STATE | |
| E) EXECUTION DATE/TIME | AT EXECUTION | JOB REQUIREMENT, OPERATION POLICY | |
| F) CONNECTION COMPONENT | AT EXECUTION | CONNECTION COMPONENT ID | |
| RESOURCE REQUIREMENT ~ 37 | | | |
| 1) AMOUNT OF CPU USED | AT EXECUTION | JOB ENVIRONMENT, OPERATION POLICY | |
| 2) AMOUNT OF MEMORY USED | AT EXECUTION | JOB ENVIRONMENT, OPERATION POLICY | |
| 3) AMOUNT OF INPUT/OUTPUT DATA | AT EXECUTION | JOB ENVIRONMENT, OPERATION POLICY | |
| FUNCTION ~ 38 | | | |
| 1) PROCESS CONTENTS | AT CREATION | FUNCTION SPECIFICATION | |
| 2) INPUT/OUTPUT INTERFACE | AT CREATION | FUNCTION SPECIFICATION | |
| RELIABILITY ~ 39 | | | |
| 1) ERROR FREQUENCY | AT EXECUTION | | JOB REQUIREMENT, OPERATION POLICY |
| 2) REQUIRED REBOOT TIME | AT EXECUTION | | JOB REQUIREMENT, OPERATION POLICY |
| 3) PERFORMANCE DETERIORATION LEVEL AT MICROREBOOT | AT EXECUTION | | JOB REQUIREMENT, OPERATION POLICY |
| 4) EXECUTION FREQUENCY OF PREVENTIVE MAINTANANCE | AT EXECUTION | | JOB REQUIREMENT, OPERATION POLICY |
| 5) MICROREBOOT POSSIBLE/IMPOSSIBLE | AT CREATION | | JOB REQUIREMENT, OPERATION POLICY |
| PERFORMANCE ~ 40 | | | |
| 1) LATENCY | AT EXECUTION | | PERFORMANCE REQUIREMENT |
| 2) THROUGHPUT | AT EXECUTION | | PERFORMANCE REQUIREMENT |

COMPONENT EXPERIMENTAL OPERATION AT EXPERIMENTAL EXECUTING UNIT

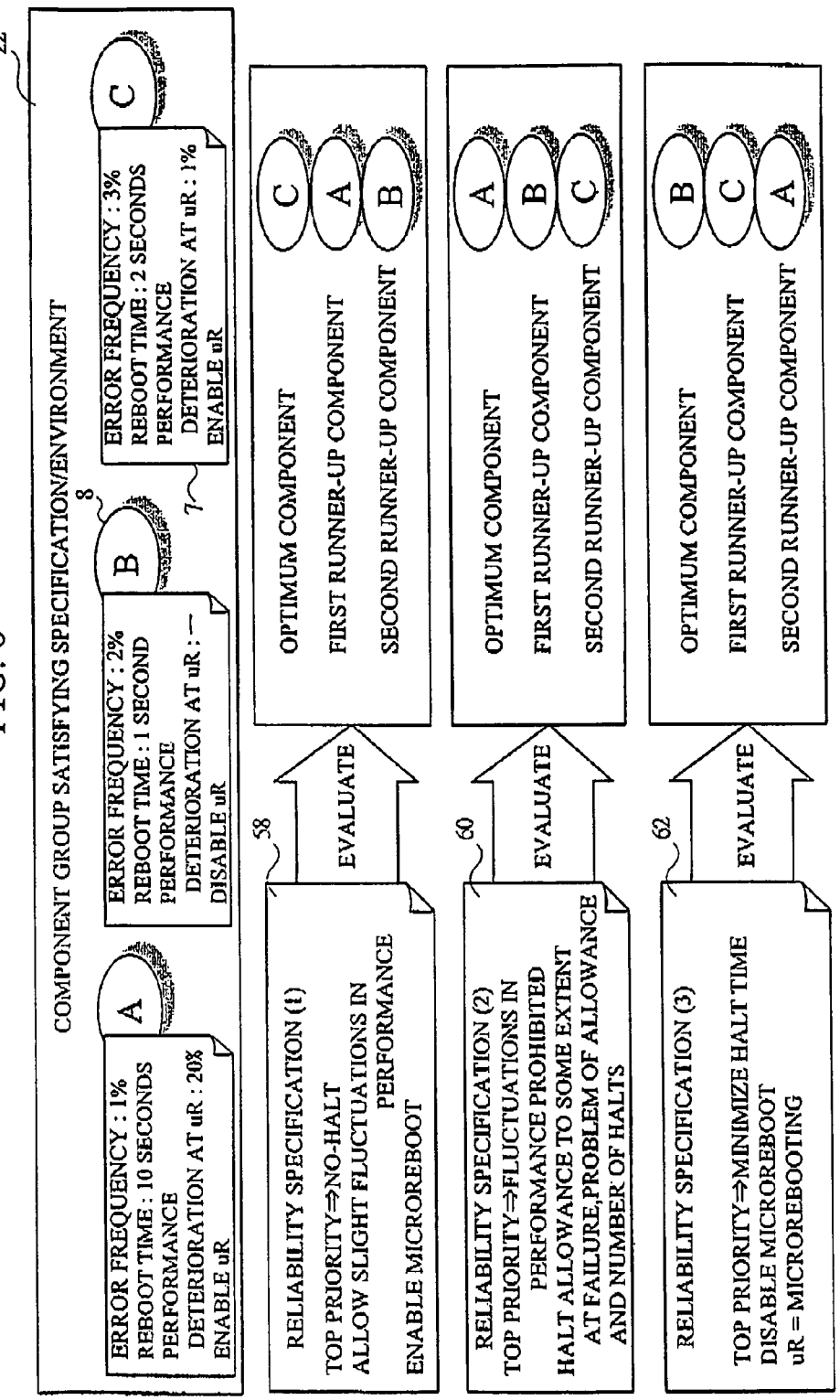

FIG. 10
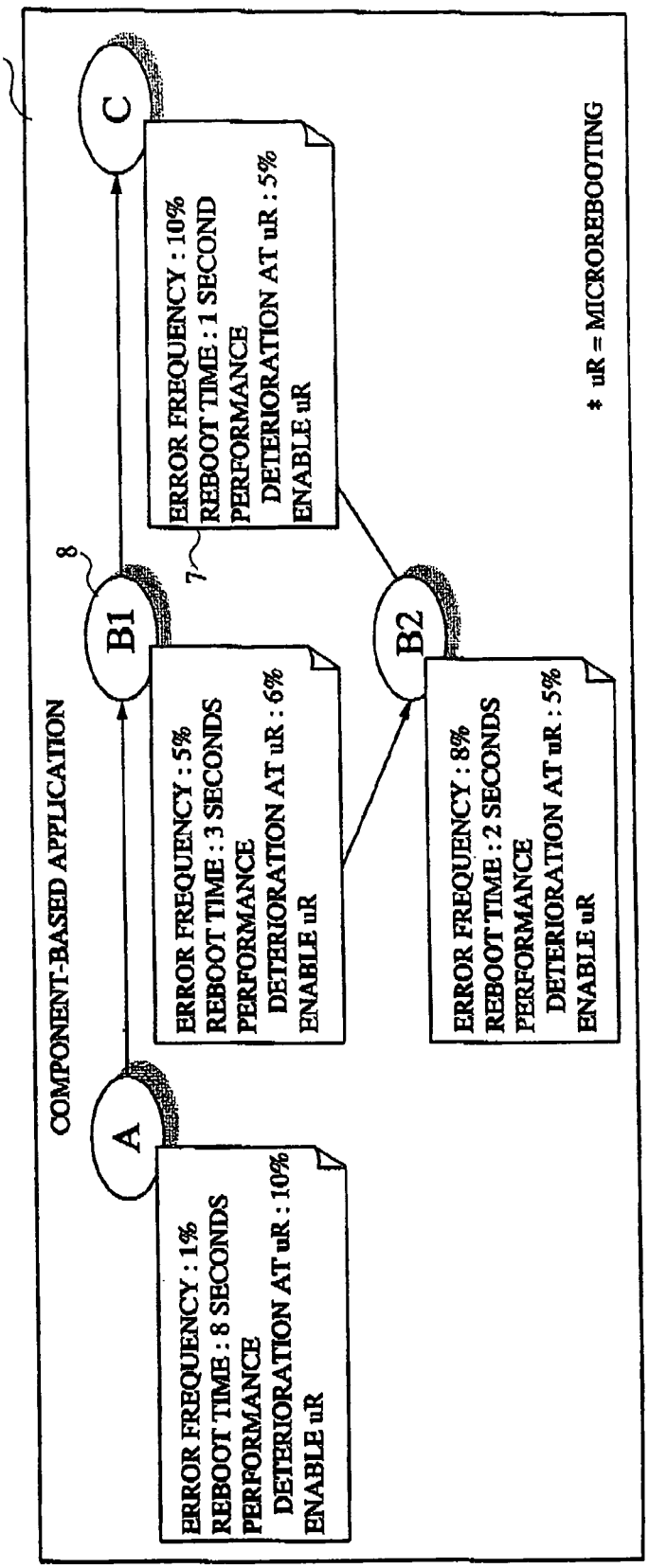
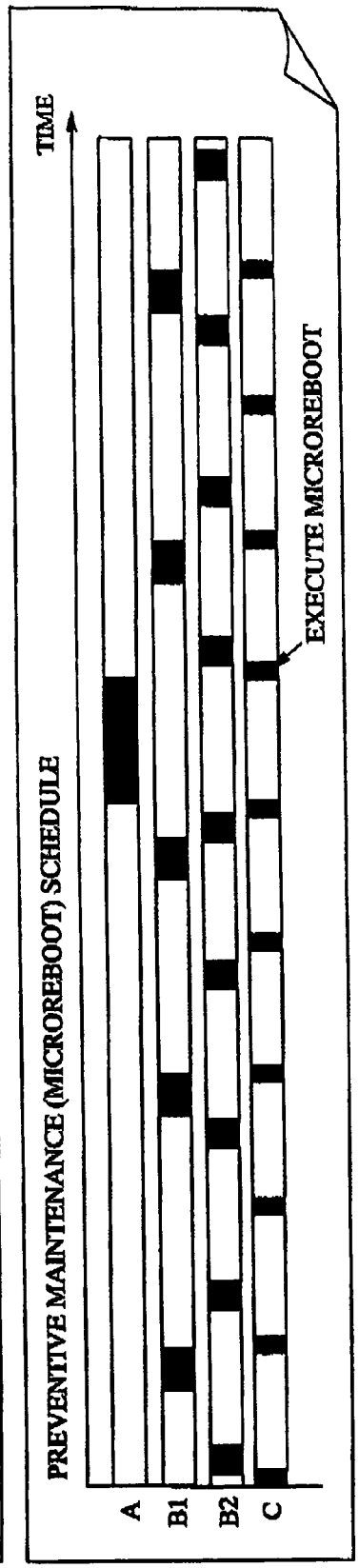

COMPONENT-BASED APPLICATION CONSTRUCTING METHOD

CROSS-REFERENCE TO RELATED APPLICATION

The present application claims priority from Japanese patent application No. JP 2004-283032 filed on Sep. 29, 2004, the content of which is hereby incorporated by reference into this application.

BACKGROUND OF THE INVENTION

The present invention relates to a method of constructing applications by combining software components that is componentized and, more particularly, to a method of obtaining and accumulating an execution history regarding reliability for each software component and a method of constructing a high-reliable system using the above method.

The use of on-line applications typified by Web services, such as electronic commerce or an intra-company information processing system on the Internet or an intranet, has been rapidly widespread. In response to demands for expansion of customers, efficient operations, and cost reduction, etc., quick and flexible system developments have been required. To achieve this, a technology for constructing applications by combining the software components typified by Enterprise Java Beans (EJB) ("JAVA" is a trademark.) has attracted attention. The application constructed by using such a technology is referred to as a component-based application.

The component-based application can be constructed by preparing in advance the software components that perform frequently-used processes and then combining these components, whereby an application development time can be reduced. Also, in order to improve applications In accordance with dynamically changing demands from the customers, what is required is to replace some relevant software components to be changed, so that quick and flexible improvement complying with the demands can be achieved.

The developments of the component-based applications have features as described above. Furthermore, with the emergence of a standard framework, such as Java2 Enterprise Edition (J2EE), the component-based applications have become widely used. As a result, various software components will be developed and accumulated.

In system construction, these software components are required to be searched for a software component having a necessary function. However, with an increase in variety of software components, a plurality of software components that are functionally equivalent to one another may possibly be found. Therefore, a technology of quickly and suitably selecting an optimum one of software component candidates will become important.

One index of selection of a software component includes system performance. However, at the time of constructing a system, it is difficult to predict the system performance of the combined software components.

Patent Document 1 (Japanese Patent Laid-Open No. 2004-220453) discloses a method in which a CPU time required for performing a process at each individual software component is measured as basic operational performance and, based on the measurement values, process performance (CPU time) required for an assumable process is predicted. According to this method, the process performance of the system in a normal process can be predicted before assembling the entire system.

Another index of selection of a software component includes system reliability. The system reliability is an important index particularly in a job system. The system performance can be improved by taking measures such as addition of hardware in many cases, whereas the system reliability is often difficult to improve by taking the same measures as those for the system performance. Particularly, in the component-based applications, reliability may be decreased depending on the combination of the software components. As such, it is difficult to predict the system reliability.

In a component-based application in Patent Document 2 (Japanese Patent Laid-Open No. 2002-82926), a process start time and a process end time are measured for each software component, thereby measuring a process time. When the process time exceeds a predetermined process time, it is determined that a process state is abnormal, for example, and then the measures for the abnormal process state are taken. Such measures include halts of the components and/or a restart of a server process. Further, a method of monitoring system reliability at the time of system operation and of obtaining measures to be taken in the abnormal state is disclosed. In addition thereto, the Patent Document 2 also discloses a method of monitoring the system performance at the time of the system operation.

SUMMARY OF THE INVENTION

As described above, the method of predicting the system performance at the time of constructing the component-based applications and the method of monitoring the system reliability and performance at the time of the operation are well known. However, there has been no effective method of constructing systems in consideration of the system reliability at the time of constructing the component-base applications. This is because, even though reliability of each software component can be evaluated at the time of constructing the systems, it has been difficult to develop an effective method of evaluating the reliability of the entire system before constructing the entire system in the component-based applications. However, in recent years, new approaches to improve the reliability in the component-based applications have been studied. Therefore, an object of the present invention is to provide an effective method of constructing the system in consideration of reliability required for the system at the time of the construction, including the use of the above approaches.

The above-mentioned new approach is described in Non-patent Document 1 (Microreboot-A Technique for Cheap Recovery, George Candea et al., OSDI '04, $6^{th}$ Symposium on Operating Systems Design and Implementation). This Non-patent Document 1 discloses that, in a component-based application, a reboot per component (microreboot) can achieve system recovery at lower cost at the time of occurrence of failure as compared with reboots of the entire applications (full reboots). In particular, the microreboot is highly likely to avoid a complete system down, which holds a major significance for improvement of the system reliability. Furthermore, the method of improving the system reliability, which can be achieved by using the microreboots to execute the reboot per component even while the system is operating normally, is described as preventive maintenance. In the Non-patent Document 1, the components for executing the microreboots for the preventive maintenance are selected based on progression of an amount of memory used by the components.

Outlines of representative ones of inventions disclosed in the present application will be briefly described as follows.

In the case of constructing an application by combining software components that are software elements, to provide a method of efficiently constructing an application by combining software components while reliability required for a system is ensured, a run-time history such as an occurrence frequency of errors, a recovery time required at error occurrence, and a processing capacity at preventive maintenance is added per software component to a run-time history list having been recoded per execution environment such as an application ID, combined component IDs, and executed hardware ID. From these pieces of information, an interval of performing preventive maintenance recommended per software component during system construction is calculated. By comparing reliability per software component and reliability required for the system, advisability is determined and conformance is evaluated. An execution schedule for preventive maintenance and a processing capability are calculated about the entire component-based application created by combining the software components. By calculating the reliability and the processing capability in the entire system to be compared to those required for the entire system, advisability is determined and conformance is evaluated.

For determination and evaluation described above, the following means are provided: means for adding a run-time history list for each software component; means for measuring, for each software component, a frequency of occurrence of errors, a time required for recovery at the time of occurrence of an error, and a processing capability at preventive maintenance at a time of executing the component-based application or by experimentally executing the component-based application; means for calculating and evaluating, from the run-time history list for each software component, reliability and processing capability of each component and for the entire system; means for comparing the reliability and processing capability of each component and of the entire system with those required for the system to determine and evaluate conformance; and means for indicating, at the time of constructing the system, a measure for preventive maintenance of each software component satisfying the reliability and processing capability required for the system in the component-based application.

Effects obtained by representative ones of the above-described inventions will be described as follows. That is, at the time of constructing a system with a component-based application, an efficient system constructing scheme in consideration of reliability required for the system can be provided.

Also, an efficient schedule for preventive maintenance can be provided which ensures both reliability and processing capability of the entire system through the preventive maintenance.

Furthermore, at the time of constructing a system with a component-based application, since optimum software components can be selected, conformance of the software components with respect to the system requirements can be provided.

Consequently, costs incurred for constructing the component-based application can be reduced.

The component-based application is constructed by preparing in advance the software components and then combining those components, so that its constructing method has the advantages of reducing an application development time and being capable of flexible improvement. However, it is difficult to select a suitable software component from many software components at the time of construction. The present invention, which an optimum software component can be selected in consideration of reliability particularly required for the system, is particularly effective in reducing costs incurred in constructing the component-based application. The present invention can also achieve the construction of the component-based application, in view of an increase in reliability at the time of system operation and an increase in system reliability through preventive maintenance by using the concept of microreboot, which is a new reliability-improvement scheme in the component-based application.

BRIEF DESCRIPTION OF THE DRAWINGS

FIG. 5 is a data configuration view showing examples of contents of an execution history list attached for each component by the component-based application constructing method according to the present invention.

FIG. 8 is a conceptual diagram showing examples for evaluating the components based on reliability specification in the component-based application constructing method according to the present invention.

FIG. 10 is a conceptual diagram showing an example of creating a preventive maintenance schedule by using the execution history list attached for each component in the component-based application constructing method according to the present invention.

DESCRIPTION OF THE PREFERRED EMBODIMENTS

Figure 1:
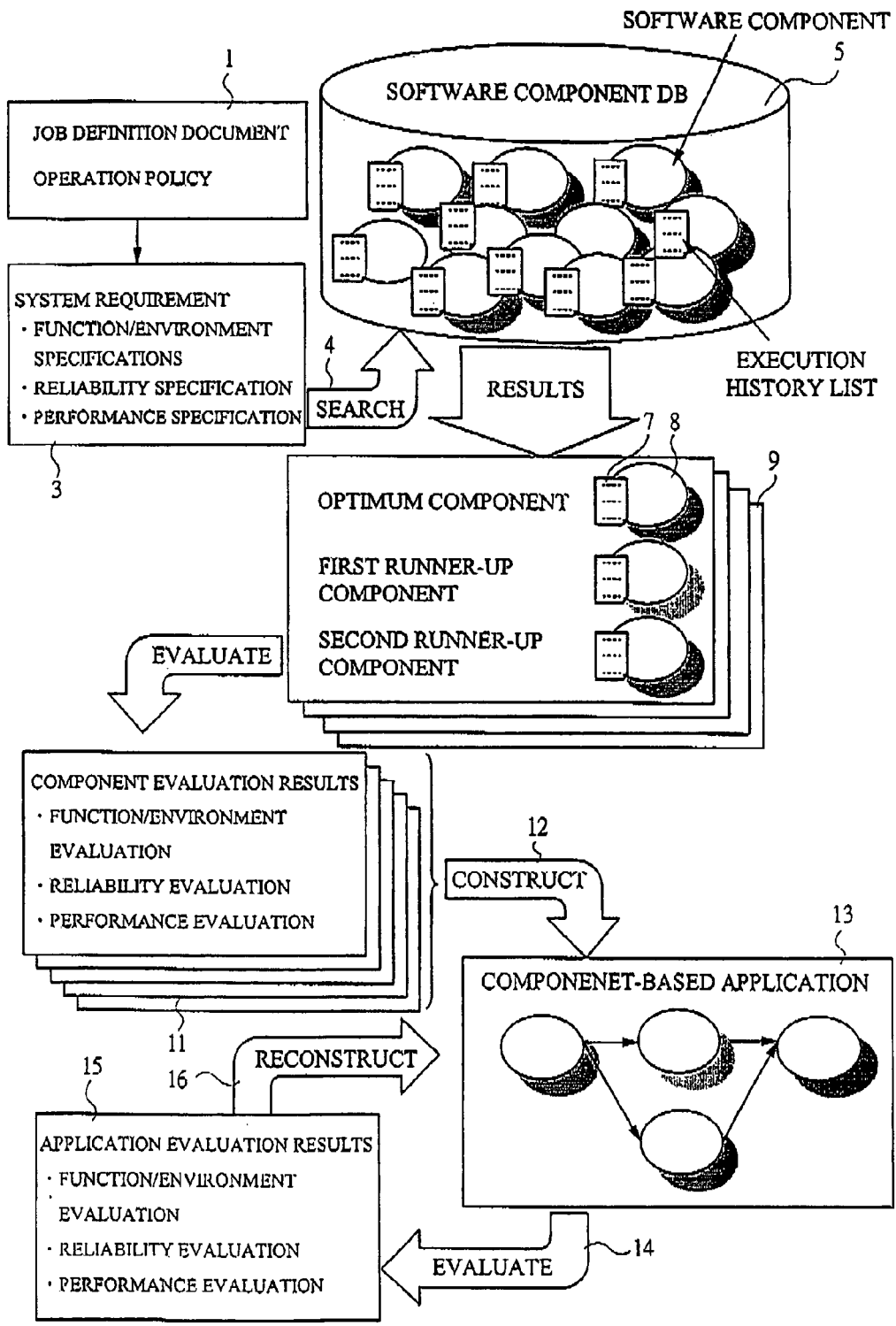
FIG. 1 is a conceptual diagram schematically showing a component-based application constructing method according to the present invention.

FIG. 1 schematically illustrates a high-reliable system constructing method in the component-based application according to the present invention. At the time of a system construction, a system designer first uses, for example, a software tool for system design to extract a system requirement 3 from a job definition document or operation policy 1.

Here, the system requirement 3 includes at least function/environment specifications, a reliability specification, and a performance specification.

The function/environment specifications describe functions to be achieved in the system to be constructed and operation environments to be provided. The functions include detailed specifications for connecting the job definition document such as a job process flow, and the configuration of the component-based application. The operation environments include: a hardware resource, an operating system (OS), and platform software such as execution platform middleware which are required for execution; settings of them; and a detailed specification or condition of system configuration information including external I/O and storage.

The reliability specifications describe requirements regarding reliability necessary at the time of execution of the application. The requirements include standards necessary for evaluating reliability, such as a frequency of allowance with respect to a frequency of system halts, a recovery scheme at the time of occurrence of a failure and an allowable range of degradation of processing performance at the time of recovery, and an allowable range of performance fluctuations. The requirements regarding the reliability may also include a plurality of standards of different levels, such as desirable standards to be abided to a maximum extent or absolute standards that must be abided by.

The performance specifications describe requirements regarding performance necessary at the time of execution of the application. The requirements include a standard such as a latency or throughput. The requirements regarding the performance may also include a plurality of standards of different levels, such as desirable standards to be abided to a maximum extent or absolute standards that must be abided by.

The system requirement 3 may also be determined not only from the job definition document or operation policy 1 but also by hearings with clients who request system designing, determination by a system designer, and the configuration of the previous or current system.

A software component database (hereinafter "software component DB") 5 is a database having registered therein software components 8 typified by Enterprise Java Beans (EJB) components. In accordance with the system requirement, the software component DB is searched (4) to select a suitable software component 8. Each of the software components according to the present invention is attached with an execution history list 7. By using his execution history 7, conformance to the required specifications described in the system requirement 3 is evaluated, and a ranking such as an optimum component, a first runner-up component, a second runner-up component, etc. is provided and then a component search result 9 is outputted. Such selection is performed for each job process in a job process flow indicated in the function specifications of the system requirement 3. For each process, one or more component is selected. Therefore, normally, a plurality of component selection results 9 are outputted for one system requirement 3.

A component evaluation result 11 is an output of a result of evaluating conformance to the specifications described in the system requirement 3 for the respective components 8 outputted in the component selection results 9. Function evaluation is an index indicative of whether the functions required for the job process described above are satisfied. Normally, the functions have to be completely satisfied. If the function that cannot be satisfied is present, an additional component is selected for complementing that function or a component has to be newly created. Environment evaluation is an index indicative of a similarity between an environment assumed in the system to be constructed and an environment described in the execution history list recorded for each component used at the time of searching. Although these environments should ideally coincide with each other, they are allowed to be similar to each other. Reliability evaluation is an output of a result of evaluating conformance to the requirements regarding the reliability in the system requirement 3. Similarly, performance evaluation is an output of a result of evaluating conformance to the requirements regarding the performance.

By using the component evaluation results 11, a system constructor selects and combines suitable software components 8 to construct a component-based application 13. This process may be performed through automation or semi-automation with a software tool. Since the component evaluation results 11 are results of evaluating conformance to the system requirement 3 for the respective components, conformance of the constructed entire component-based application 13 to the system requirement 3 has to be re-evaluated (14). A re-evaluation result is an application evaluation result 15, from which the application is reconstructed as required (16).

Figure 2:
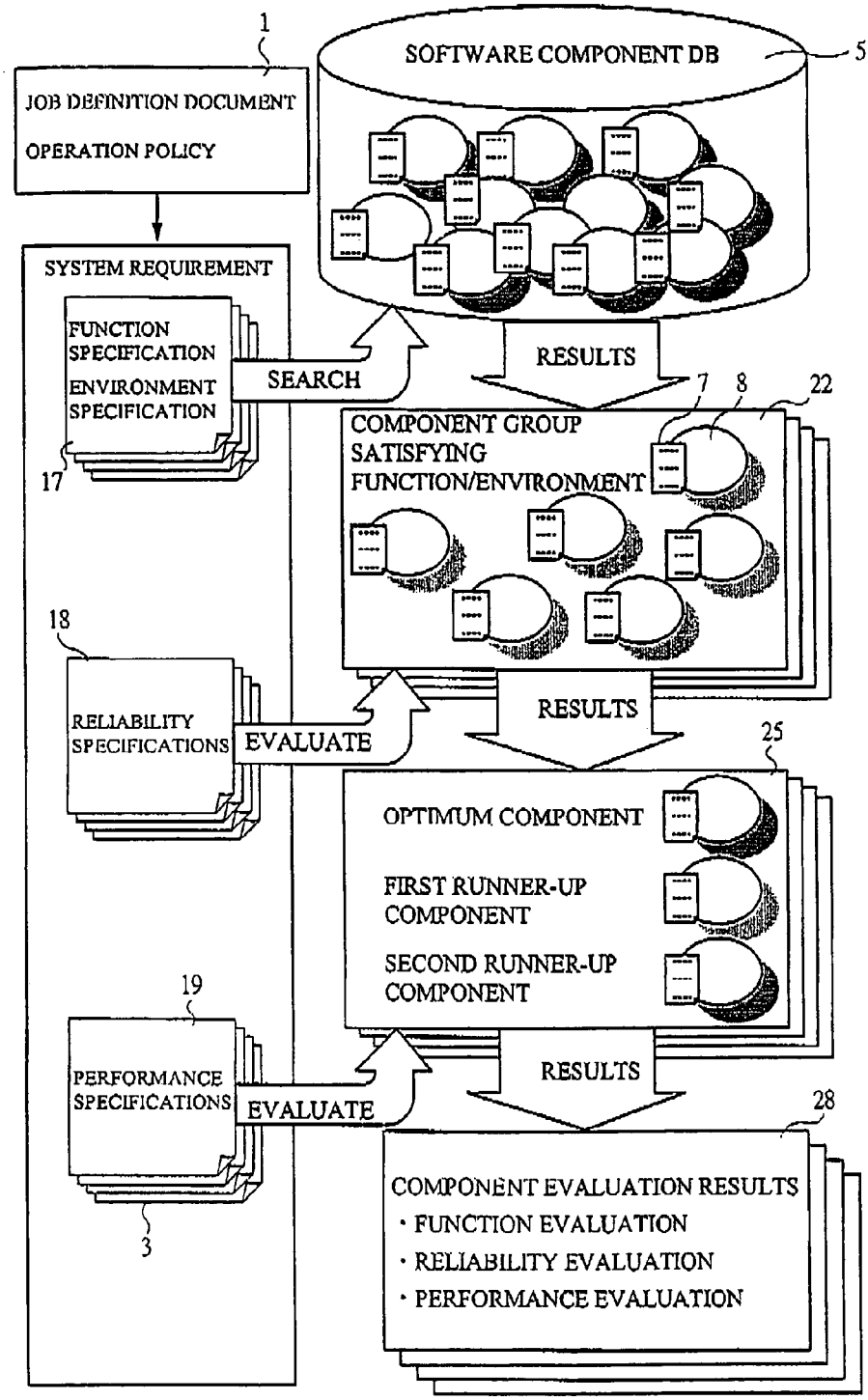
FIG. 2 is a conceptual diagram showing a method of selecting a component in the component-based application constructing method according to the present invention.

FIG. 2 is a diagram of an exemplary implementation of processes of searching the software component, DB 5 based on the system requirement 3 shown in FIG. 1 and of outputting the component evaluation result 11. The system requirement 3 includes, for each job process, function/environment specifications 17, reliability specifications 18, and performance specifications 19. Each specification indicates a condition or requirement for one or more software components.

First, the software component DB 5 is searched based on the function/environment specifications 17. Since the function specification describes the function to be achieved in the application, the software components 8 having such functions are retrieved. Also, based on the environment specification, the software components 8 conforming to the execution environment are retrieved. A search result 22 indicates a group of software components satisfying the specification at minimum for constructing the application. This searching may be performed by increasing a range of the requirements described in the environment requirements 17, thereby allowing a search for nearly-conforming software components having a possibility of conforming to the execution environment. Such software components 8 retrieved in the above-described manner are useful because they have a possibility of being usable only with a slight improvement or modification. Also, even if software components completely conforming to the execution environment are not included in the software component DB 5, software components having a possibility of conforming to the execution environment with an improvement or modification are presented, so that construction of the application can be advanced. Note that the software components searched as the nearly-conforming software components are preferably provided with marks so as to be differentiated from the completely-conforming software components.

Next, the software components included in the search result 22 are evaluated based on the reliability specifications 18. Then, an optimum component, a first runner-up component, a second runner-up component, and others are selected. In evaluation, conformance to the requirements described in the reliability specifications, which are included in the execution history list 7 attached for each software component, 8 is evaluated. Next, conformance to the performance specifications 19 is evaluated in a manner similar to a manner for evaluating conformance to the reliability specifications, thereby eventually outputting component evaluation results 28. Evaluations regarding the reliability specifications 18 and the performance specifications 19 may be performed not in the order shown in FIG. 2 but in the reversed order or may be performed simultaneously, and then an optimum component, a first runner-up component, a second runner-up components, and others may be outputted based on the collective evaluation results.

Figure 3:
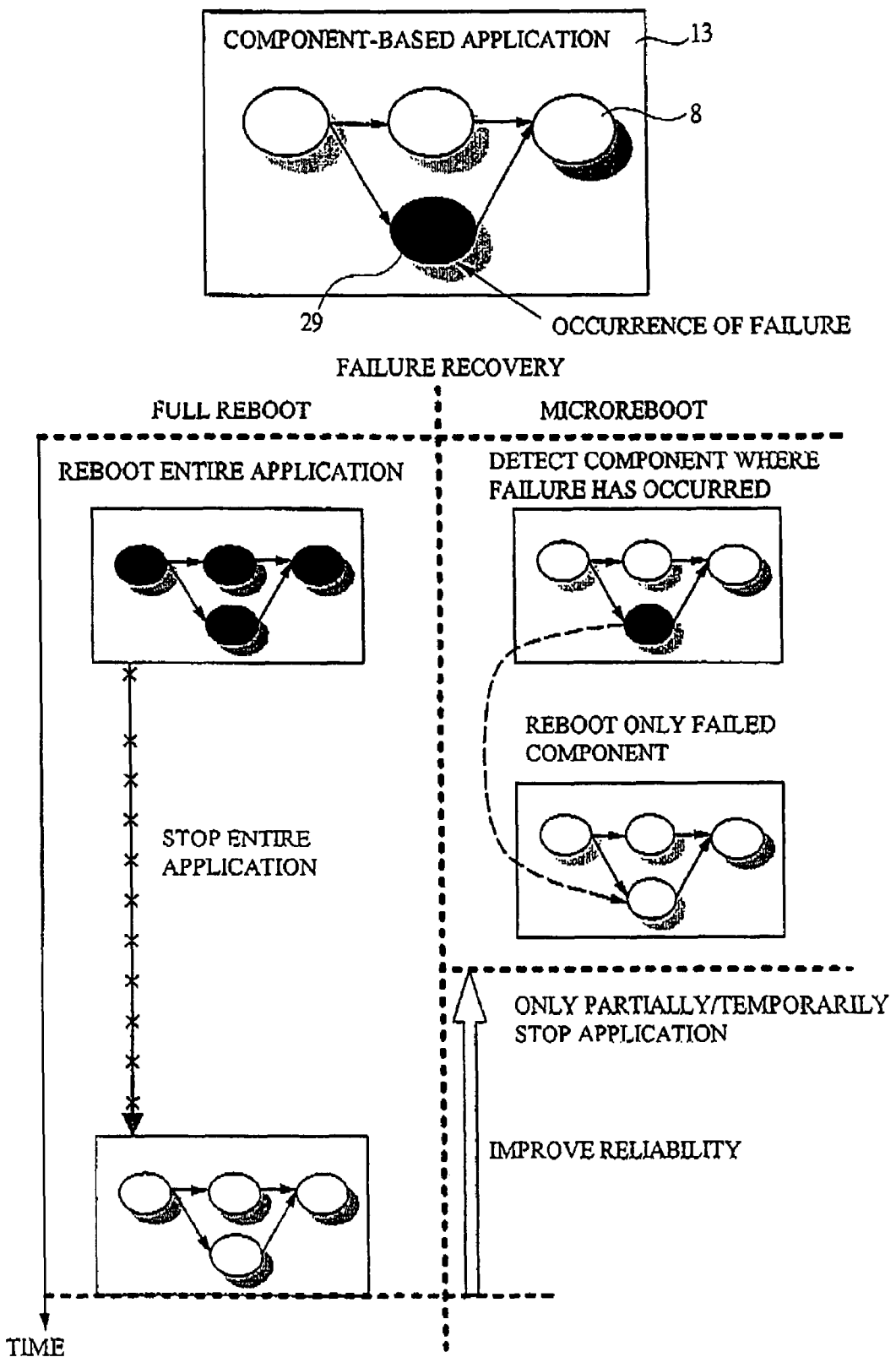
FIG. 3 is a conceptual diagram showing methods of improving reliability in failure and recovery at a time of executing a component-based application used in the present invention.

FIG. 3 illustrates an exemplary implementation of recovery methods when a failure occurs at the time of execution of the component-based application. In a failure recovery method called a full reboot, when a failure occurs at one component 29 among the components forming the application 13, the entire application is rebooted for failure recovery. In the full reboot, the entire application is halted during the reboot, and a halt time may be several seconds to several minutes depending on the application and the environments. Meanwhile, in another failure recovery method called a microreboot, a component in which a failure has occurred or is assumed to have occurred is detected, and only this component is rebooted. In the microreboot, components other than the component being rebooted are continuously executed during the failure recovery, and the application is halted only partially or temporarily, whereby a halt time and the magnitude of the halt is generally reduced as compared with the full reboot and reliability thereof is improved. However, the microreboot is not necessarily usable for any cases. When the component in which the failure has occurred or is assumed to have occurred is a statefull component, for example, such a component may not be returned to its original state by a reboot. In this case, the full reboot may be required.

Figure 4:
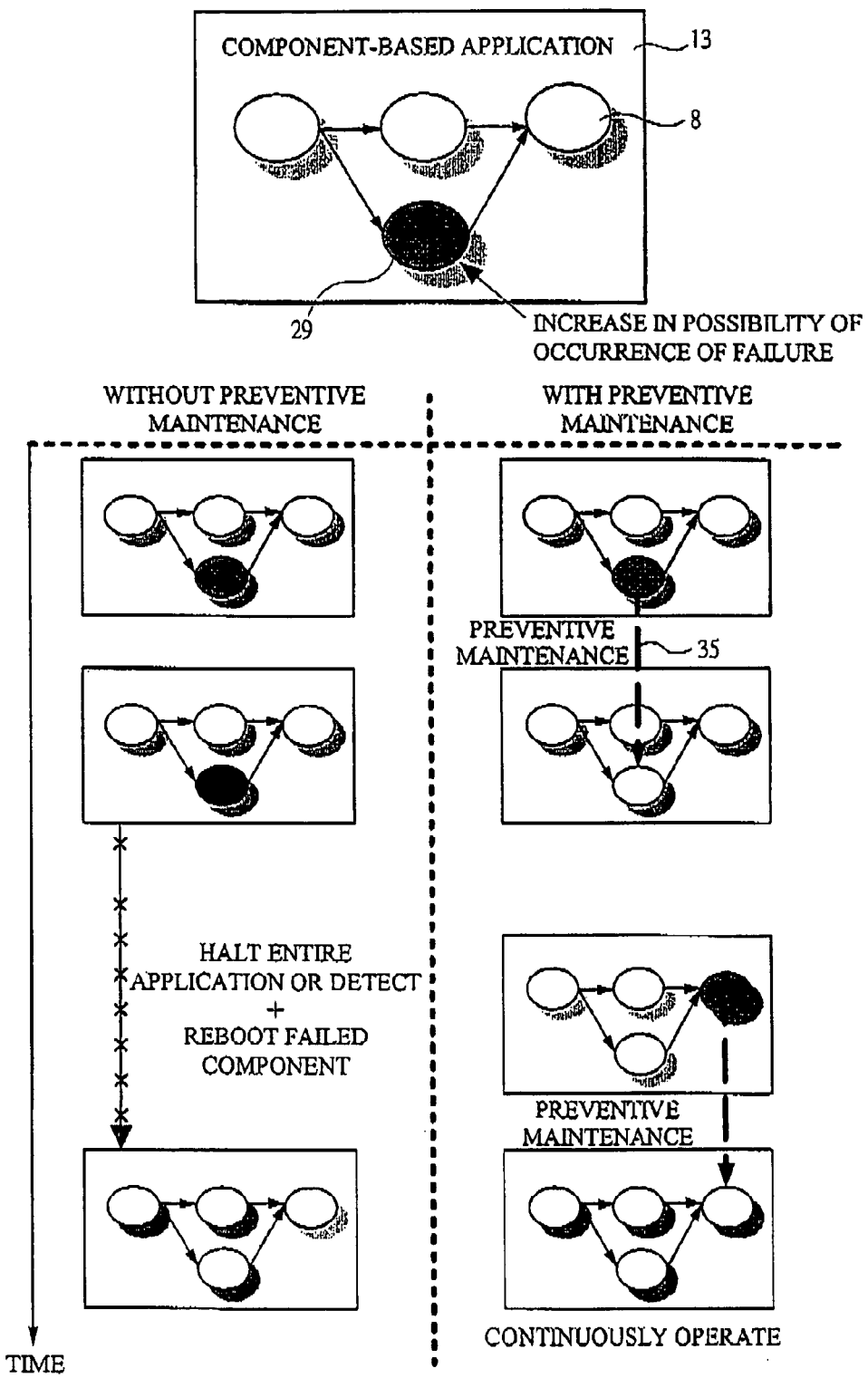
FIG. 4 is a conceptual diagram showing a method of improving reliability by performing preventive maintenance at the time of executing the component-based application used in the present invention.

FIG. 4 illustrates an exemplary implementation of preventive maintenance, which is a scheme of improving reliability at the time of execution of the component-based application. In this scheme, when it is determined in the component-based application 13 that a possibility of occurrence of a failure in components 33 has been increased, the components 33 are rebooted for failure prevention, whereby the possibility of occurrence of the failure is decreased and continuous operation of the application is allowed. In the microreboot at the time of occurrence of the failure shown in FIG. 3, detection and reboot of the component in which the failure has occurred is not carried out. However, the application is monitored to detect, during the execution of the application, a component in which a possibility of occurrence of the failure has been increased, and then the detected component is rebooted at appropriate timing. Without the preventive maintenance, failure recovery is performed by the full reboot or microreboot only after the occurrence of the failure. Therefore, since the application is halted completely, partially, or temporarily, the reliability thereof may degrade in comparison with the case of performing the preventive maintenance.

FIG. 5 illustrates exemplary contents of the execution history list 7 attached for each component according to the present embodiment. In an index portion 36 of the execution history list 7, business/job types, application names, information regarding executed hardware, run-time system load states, execution data and time, and connection-source or connection-destination components, etc are recorded as environments where the components are used. In a resource requirement portion 37, an amount of CPU used, an amount of memory used, and an amount of data inputted/outputted, etc. at a time when the components are operated are recorded.

In a function portion 38, which is searched based on the function specifications, a process to be performed by the components 8 and an input/output interface are recorded. In addition to these, in Java Bean typified by EJB, for example, each function of the components 8 normally includes a mechanism such as introspection for notifying a function of the component to the outside.

A reliability portion 39 is an item used at a time of evaluating matters relative to the reliability of the components 8, and includes an error frequency at the time of execution, a reboot time to be required, a performance deterioration level caused at the time of executing the microreboot, and execution frequency of the preventive maintenance, etc. and further includes information of whether the microreboot of the components can be executed.

A performance portion 40 includes a latency and a process performance required for one process at the time of executing the components 8. These performance values may be recorded as maximum values or average values in some cases.

The number of execution history list 7 provided to each component 8 is not limited to one. Alternatively, for example, the execution history list may be provided every time the components are executed in another system or every time the components are used as having another function.

Figure 6:
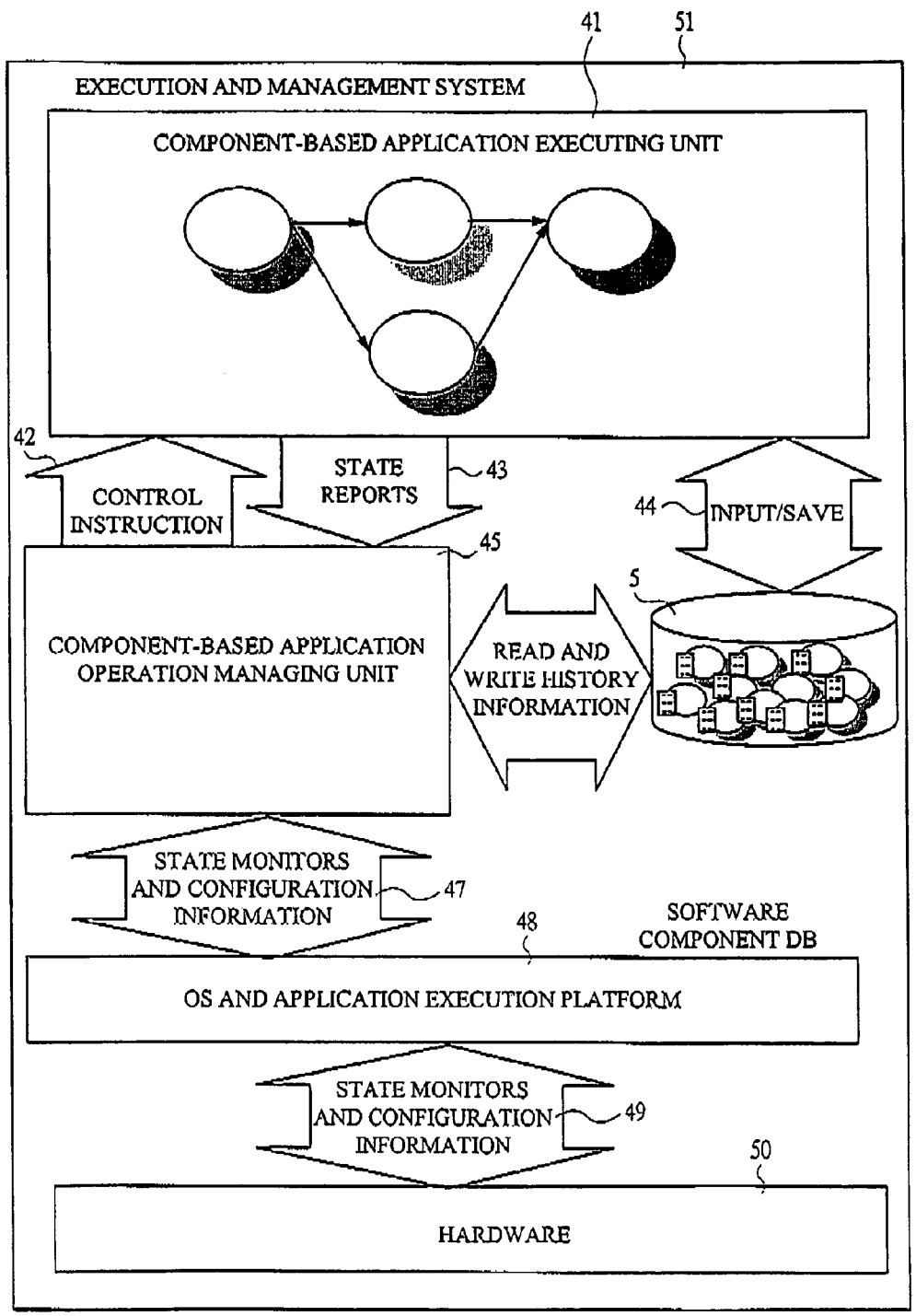
FIG. 6 is a conceptual diagram showing an example of an execution and management system for creating and updating the execution history list attached for each component according to the present invention at a time of executing the application.

Next, a method of recording the execution history list 7 will described. FIG. 6 illustrates an example of an execution and management system, which has means for recording measurement results on the execution history list at the time of normal execution of the component-based application. The application is executed by a component-based application executing unit 41. Upon reception of a control instruction 42 from a component-based application operation managing unit 45, the component-based application executing unit 41 starts and halts the application, and also executes an input/save (44) of a component with the software component DB 5. Also, from the component-based application executing unit 41 to the component-based application operation managing unit 45, a report on the state of the application and the components is given (43). The state report (43) mainly includes a report on reliability and performance. Between an OS, an application execution platform 48, or hardware 50, etc. and the component-based application operation managing unit 45, instructions and checks regarding state monitors and configuration information are given and carried out, respectively (47, 49). Resource requirements (see the resource requirement portion 37 in FIG. 5) are measured from these state monitors. Also, requirements regarding the reliability and performance may be measured from these state monitors (47, 49). Furthermore, instructions and checks regarding the state monitors and the configuration information may be used for creating indexes (see the index portion 36 in FIG. 5).

Figure 7A:
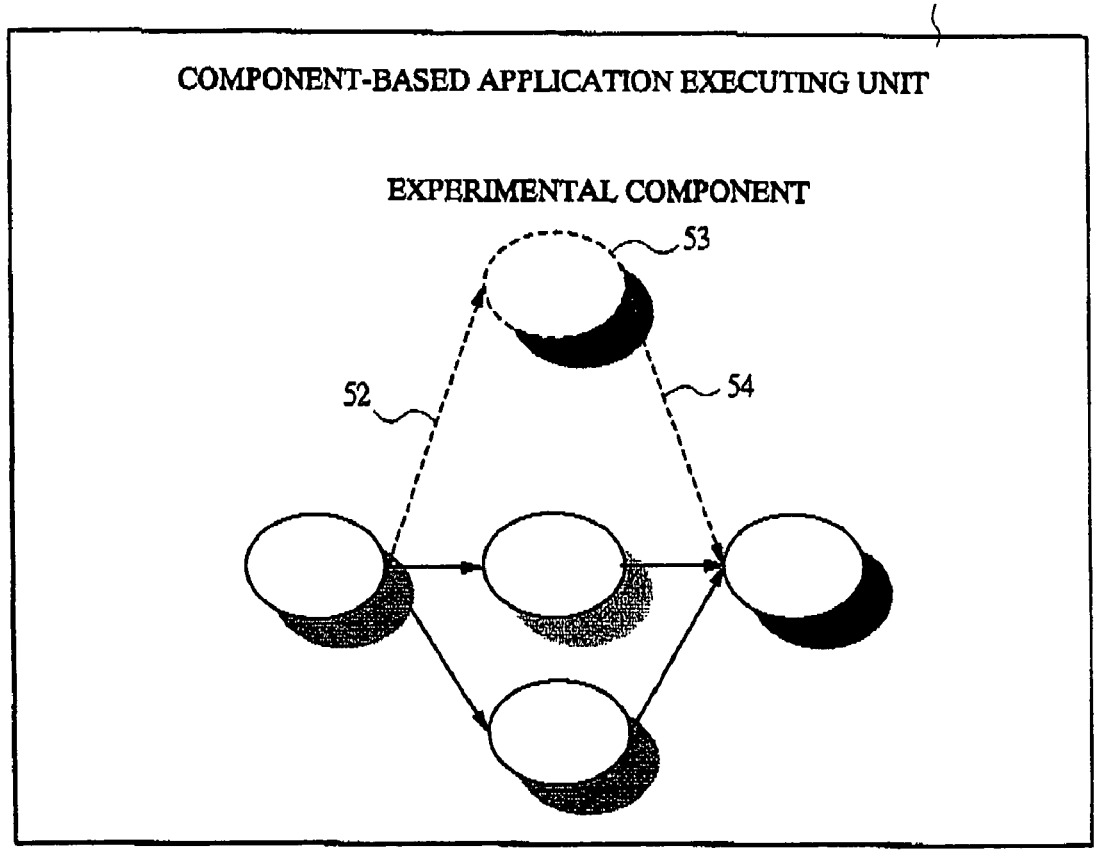
FIG. 7A is a conceptual diagram of exemplary methods of creating and updating the executing history list attached for each component according to the present invention by experimentally executing the application and shows a component experimental operation at an execution unit.

Another method of recording the execution history list 7 will be described. FIG. 7 illustrates exemplary methods of experimentally performing an operation for generation and updating of the execution history list 7 in the component-based application. In FIG. 7A, by adding experimental components 53 to a part of the component-based application and executing them, the execution history list of the experimental components 53 are created and updated. An input line 52 of the experimental component 53 communicates with information required for executing the experimental components 53, but this input line 52 should not have an influence on execution of other normal components or record of the execution history list. Also, an output line 54 of the experimental component 53 is not used in practice for communication from the experimental components 53 to an output-destination component, but is required for measurement for the execution history. As with the input line 52, the output line 54 should not have an influence on execution of other normal components or record of the execution history list.

Figure 7B:
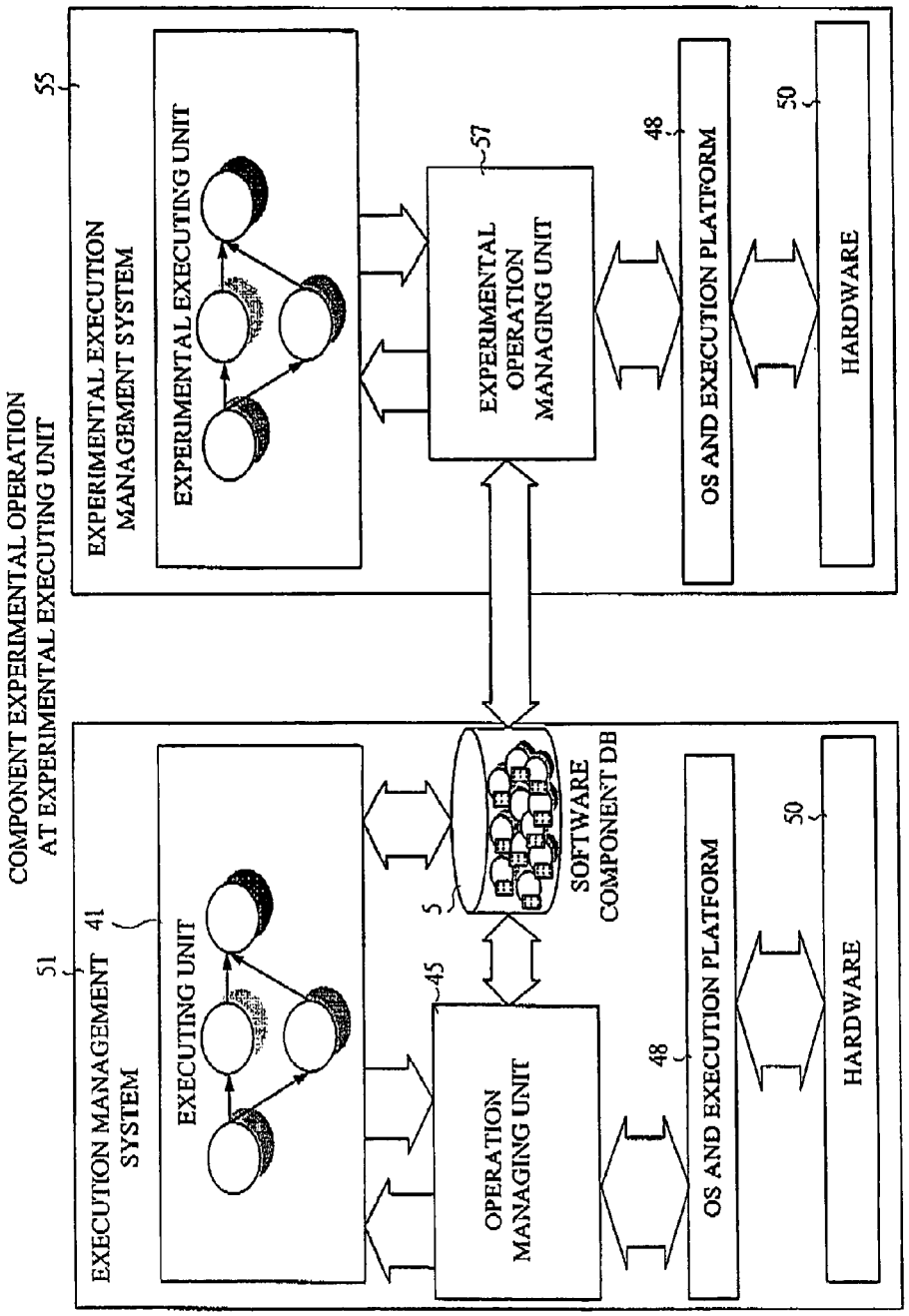
FIG. 7B is a conceptual diagram of exemplary methods of creating and updating the executing history list attached for each component according to the present invention by experimentally executing the application and shows a component experimental operation at an experimental execution unit.

Also, FIG. 7B illustrates another exemplary method for experimental operation. An execution management system 51 and an experimental execution management system 55 equivalent thereto are provided. A component, for which the execution history list 7 is to be created or updated on the experimental execution management system, is executed. Recording in the execution history list 7 through this execution is carried out via an experimental operation managing unit 57 at the software component DB 5 on the execution management system. Thereby, the execution history list 7 can be created and updated without having any influence on the executing unit 41 in practice. Note that the OS, execution platform 48, and the hardware 50, etc. are not only doubly provided on the execution management system 51 and the experimental execution management system 55 but also may be partly or entirely shared in other methods.

In addition, in both of FIGS. 7A and 7B, the experimental operations may be carried out by using some vacant resources.

Next, FIG. 8 illustrates examples of evaluation of the components depending on the reliability specifications 18 shown in FIG. 2. The execution history lists 7 of components A, B, and C included in the component group 22 satisfying the specifications and environments become in states as shown in FIG. 8, respectively. In FIG. 8, three examples of the reliability specifications are shown and evaluation results based thereon are also shown.

First, in the reliability specification (1) (denoted by the reference numeral "58"), the case where no halt is a top-priority requirement and slight fluctuations in performance are allowed and the use of the microreboot is possible is illustrated and therefore, in order to achieve no-halt, the preventive maintenance is performed. Thus, first of all, the component B, in which the use of the microreboot is impossible and preventive maintenance thereof is difficult and the halt may occur, is placed in the lowest rank. Also, based on the error frequency and the performance deterioration level at the microreboot, the component C, in which an amount of reduction in performance is small, becomes an optimum component. An example of a method of evaluating the components A and B is that values obtained by multiplying the error frequency by the performance deterioration level at the microreboot are compared in magnitude.

In the reliability specification (2) (denoted by the reference numeral "60"), the case where although prohibition of fluctuations in performance is the top-priority requirement and halts are allowed to some extent at the time of failure, the number of halts is preferably small is illustrated and therefore the microreboot, which causes fluctuations in performance, cannot be used. Also, in order to reduce the number of halts, the components are placed in higher-priority ranks in order of decreasing the error frequency by comparing the error frequency, so that the components A, B, and C are evaluated in this order.

In the reliability specification (3) (denoted by the reference numeral "62"), the case where although minimizing the halt time is the top-priority requirement, the use of microreboot is impossible is illustrated. In this case, based on the error frequency and the reboot time, a method of comparing values obtained by multiplying the error frequency with the required reboot time is used to evaluate each halt time, so that the components B, C, and A are evaluated in this order.

Figure 9:
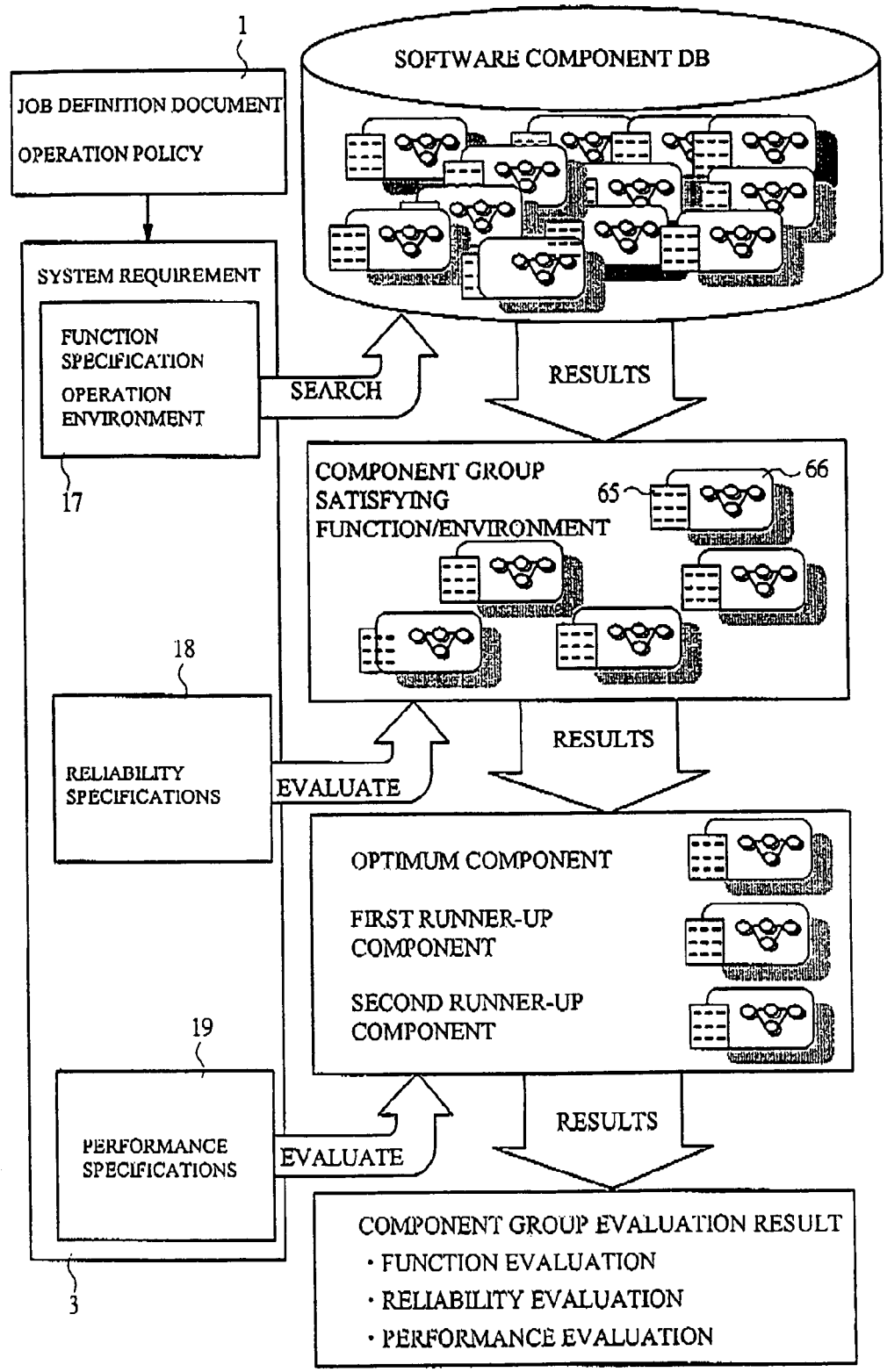
FIG. 9 is a conceptual diagram schematically showing a method of constructing a combination of a plurality of components, which is used as a unit, in the component-based application constructing method according to the present invention.

In the foregoing, the case where the execution history list is provided for each component and the construction and management of the application is performed for each component 8 has been described. However, the method according to the present invention may be applied to the case where a combination of a plurality of components is regarded as being equivalent to a single component. FIG. 9 is a diagram of a method in which, with a combination of components being taken as a single component group 66, an execution history list 65 is attached for each component group and an optimum component group at the time of constructing an application is selected.

To perform the preventive maintenance, a schedule for preventive maintenance can be created through the application constructing method according to the present invention. FIG. 10 illustrates an example of creating a preventive maintenance schedule. From the execution history list 7 attached for each component 8, information on reliability is obtained. Depending on the execution frequency of the preventive maintenance, and the performance deterioration level at the time of execution of the preventive maintenance, etc., a preventive maintenance schedule with minimum fluctuations in performance can be created, for example. By way of example, the error frequency of the component C is ten times higher than the error frequency of the component A, so that the preventive maintenance is performed on the component C at the frequency ten times higher than the frequency of the preventive maintenance to be performed on the component A. Since the error frequency of the component C is 10%, the preventive maintenance is performed once in ten processes, for example. If it is assumed that a time required for the preventive maintenance is a reboot time and performance of the process is deteriorated only during such a time to a degree of the performance deterioration level at the microreboot shown in the execution history list 7, it is important to arrange the preventive maintenance schedules of the respective components so that they are not overlapped as much as possible. A chart shown at the lower portion of FIG. 10 represents a preventive maintenance schedule 70 created in view of the component-based application 22 shown at the upper portion of FIG. 10. In this preventive maintenance schedule 70, a horizontal axis represents time while a vertical axis represents each component. Black portions in the bar chart each represent a time during which the preventive maintenance is performed on the relevant component. In this case, the preventive maintenance is performed on only a single component at the same time.

In the foregoing, the method of constructing the component-based application has been described. However, by using the above-described method of evaluating the software components, pricing of the software components according to the environments can also be performed. For example, if reduction in the executed resources is the top priority, the software component having a high reliability index and a high resource requirement can be highly priced more than the software component having a low reliability index and a high resource requirement. Furthermore, the software component having a low reliability index and a high resource requirement can also be priced much more highly.

The high-reliable system constructing method for the component-based application, which is shown in the present invention, can provide an efficient system constructing method in view of the reliability required for the system when the system created by the component-based application is constructed. Therefore, it is possible to expand the applicable extent of the component-based application. Also in evaluating the reliability at the time of the system construction in order to realize the component-based application with high reliability, the use of the present invention can make the evaluation easily and with high accuracy and further reduce the costs required for constructing the high-reliable component-based application by the high-reliable method included also at the time of operating the protective maintenance schedule etc. In addition, by the evaluating method described in the present invention, it is possible to price the components in accordance with the execution environment etc. and accordingly realize more flexible distributed business for component.

What is claimed is:

1. A component-based application constructing method of constructing an application by combining a plurality of software components, the method comprising the steps of:

recording, as an execution history of each of the software components, a history of reliability indexes including an error frequency, a time required for a reboot and a performance deterioration level of an application, composed of the corresponding software component during a preventive reboot is executed on the corresponding software component, all of which are accumulated through plural-time executions of each of the software components, so as to correspond to each of the software components stored in a software component database;

recording, as said execution history, an execution environment of the corresponding software component;

retrieving a component having a same execution history as that of an execution environment of the application to be constructed;

when an objective component-based application is to be constructed by combining the software components, referring to said recorded execution history to evaluate reliability at a time of executing the constructed component-based application; and reflecting an evaluation result in selecting a component adopted for construction of said objective component-based application.

2. The component-based application constructing method according to claim 1, wherein said execution history is recorded in accordance with a component-based application execution environment capable of measuring said history of the reliability index at a time of executing the corresponding software component.

3. The component-based application constructing method according to claim 1, wherein said execution history is recorded by using a component-based application execution environment in which an execution environment capable of being experimentally executed to measure a history of a reliability index at a time of executing the corresponding software component and the history of the reliability index are recorded.

4. The component-based application constructing method according to claim 1, wherein a similar execution environment to the execution environment of the application to be constructed is also retrieved as the component having the same execution history.

5. The component-based application constructing method according to claim 1, wherein said execution history is recorded for each of groups of the stored software components, and said application is constructed by regarding each of the groups of the software components as a unit.

6. The component-based application constructing method according to claim 1, further comprising the step of:

using said execution history to determine a pricing of the component-based application created by the software component or by a combination of the software components in accordance with a component-based application execution environment.

7. The component-based application constructing method according to claim 1, wherein a value obtained by multiplying the value of the error frequency with the value of the performance deterioration level is used to evaluate reliability of the constructed component-level application.

8. The component-based application constructing method according to claim 1, wherein a value obtained by multiplying the value of the error frequency with the value of the time required for a reboot is used to evaluate reliability of the constructed component-level application.

* * * * *